July 28, 1959 W. A. DE SMIDT ET AL 2,897,327
CONTROL-STATION
Filed Nov. 12, 1957 6 Sheets-Sheet 1

INVENTORS
WOODROW A. DE SMIDT
FRED F. LOOCK
CEDRIC E. ZARWELL
BY
Suarles, Fox, Seidel,
Bateman & Hoar
ATTORNEYS

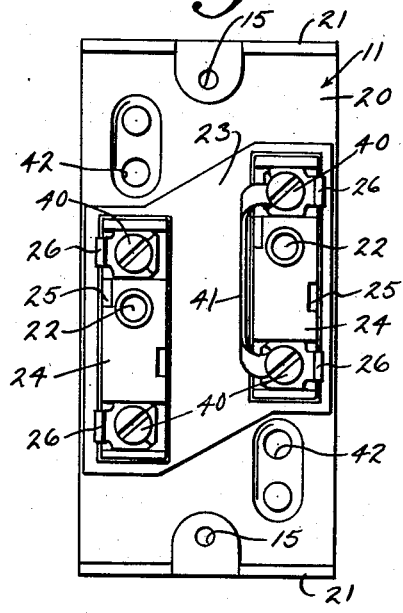

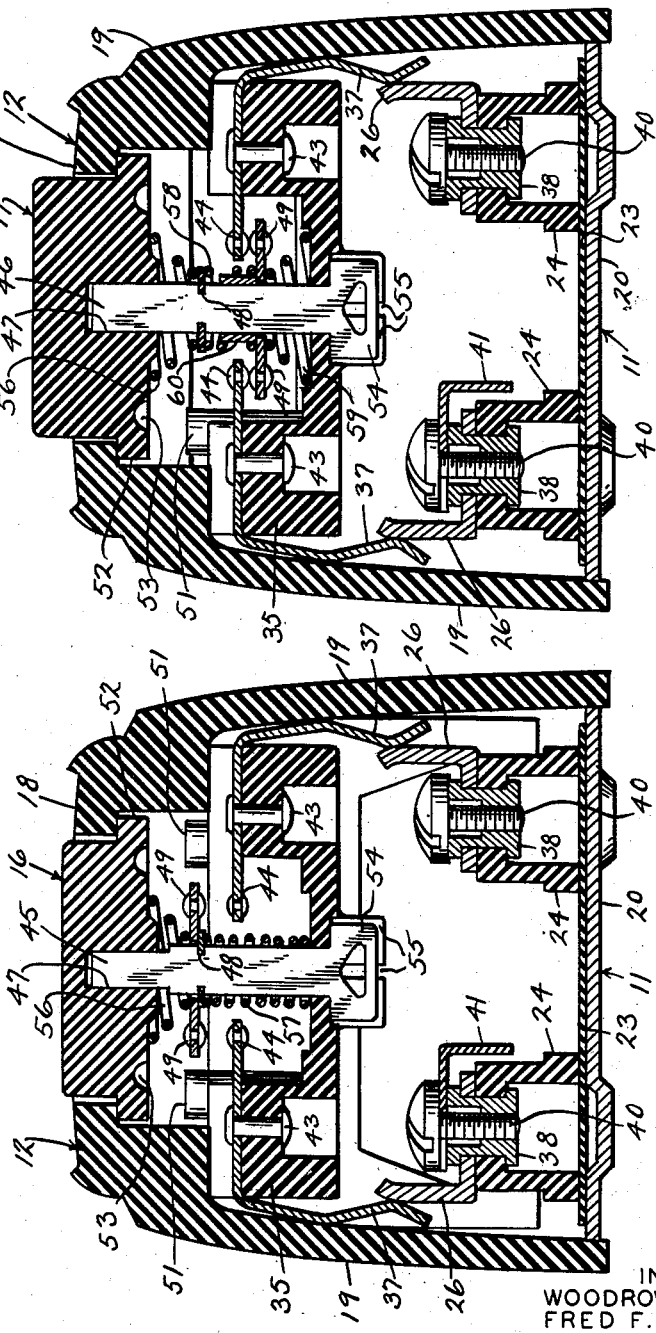

INVENTORS
WOODROW A. DE SMIDT
FRED F. LOOCK
CEDRIC E. ZARWELL

ATTORNEYS

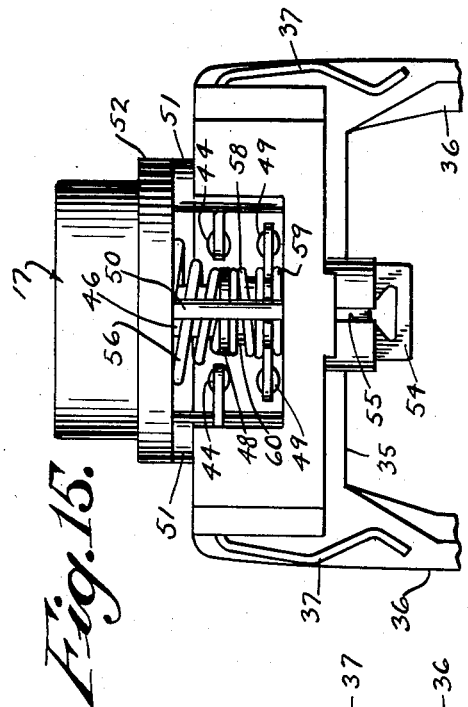
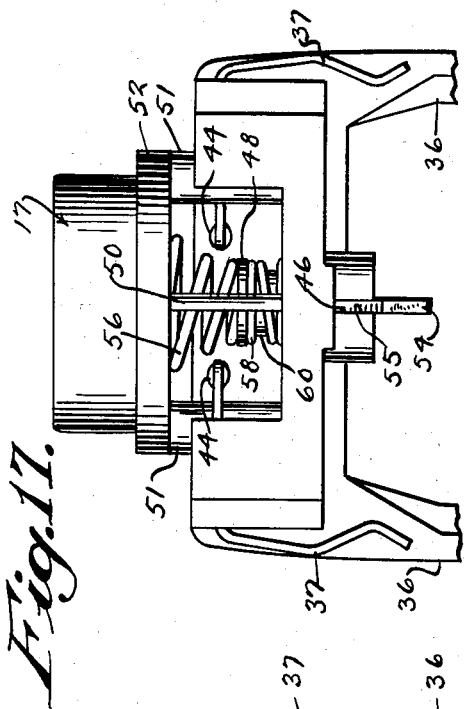
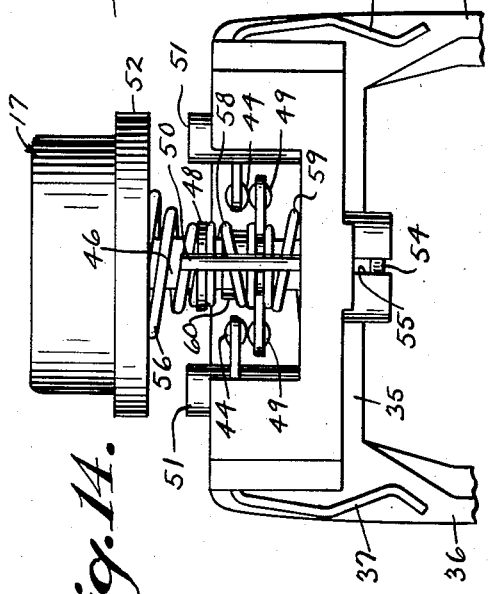
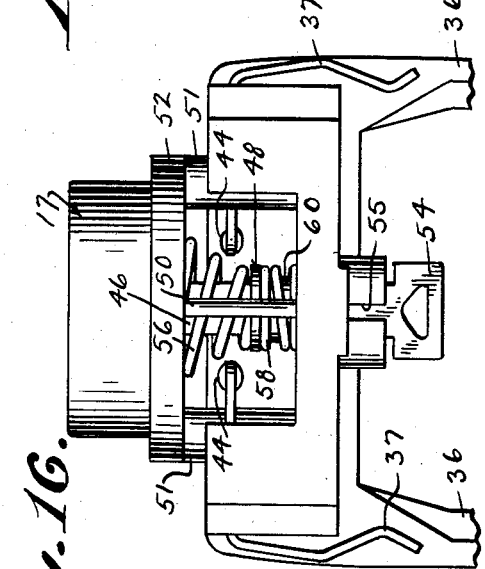
INVENTORS
WOODROW A. DE SMIDT
FRED F. LOOCK
CEDRIC E. ZARWELL
ATTORNEYS July 28, 1959  W. A. DE SMIDT ET AL  2,897,327
CONTROL-STATION
Filed Nov. 12, 1957  6 Sheets-Sheet 6

INVENTORS
WOODROW A. DE SMIDT
FRED F. LOOCK
CEDRIC E. ZARWELL

BY Quarles, Fox, Seidel,
Bateman & Hoar

ATTORNEYS

United States Patent Office 2,897,327
Patented July 28, 1959

2,897,327

CONTROL-STATION

Woodrow A. De Smidt, Whitefish Bay, Fred F. Loock, River Hills, and Cedric E. Zarwell, Shorewood, Wis., assignors to Allen-Bradley Company, Milwaukee, Wis., a corporation of Wisconsin Application November 12, 1957, Serial No. 695,599

3 Claims. (Cl. 200—168)

This invention relates to control-stations, primarily manual; and more particularly to an electrical switch comprising: a base and a cooperating readily removable cover, which together form a boxlike enclosure for the mechanism; wherein the base carries within the enclosure a plurality of first assembly contacts and a plurality of terminals, each terminal being conductively connected with certain of said first contacts; and wherein the cover carries within the enclosure a plurality of cooperating assembly contacts, to conductively engage respectively said first contacts when the cover is in place on the base; switching mechanism, carried within the enclosure by the cover, for conductively connecting certain of the cooperating contacts together at will; and means for actuating the switch, usually by manual operation, from outside the box.

Switches of that general type will possess the following advantages, among others:

(1) The terminals are more accessible, both for installation and for checking wiring, without interference from the switch mechanism.

(2) There is no danger of damage to delicate switch-mechanism during installation. This not only protects the switch mechanism, but also speeds-up installation.

(3) Responsibility is properly divided between electrician and manufacturer, inasmuch as the electrician does all his installation-work on the sturdy base, and then merely inserts the delicate mechanism of the switch.

(4) The switch mechanism too is more accessible, and can be serviced or replaced without disturbing the wiring or the wiring-connections.

(5) As a safety feature, the switch cannot be operated unless the cover is in place.

Accordingly it is the principal object of the present invention to construct an improved switch of the above general type, which will possess the above characteristics to an enhanced extent.

A further object is to construct a switch which will possess certain additional advantages.

To these ends the base of the present invention constitutes the back and ends of the boxlike enclosure, and the cover constitutes the front and sides. This not only renders the terminals much more accessible for wiring, without reducing the accessibility of the switch mechanism, but also contributes to certain of the following features of the present invention:

(1) The assembly contacts carried by the base are comparatively rigid, and the cooperating assembly contacts carried by the cover are comparatively resilient and are braced by the sides of the cover against undue distortion.

(2) The switch mechanism contained in the cover includes push buttons bearing legends such as "stop" and "start," and the like; and there is mechanism whereby these buttons can be oriented to conform to the orientation of the switch, without removing the buttons from the cover or otherwise disassembling the switch mechanism for this purpose.

(3) The cover and the base are slidably keyed together so that the mechanism will properly engage when the cover is in place on the base.

Other objects and advantages of the invention will appear in the description which follows.

The present invention is intended for use primarily as a control-station, either on the machine to be controlled, or at a distance. Although the embodiment herein shown and described is manually operated, it will become obvious as the description progresses that the present invention is equally applicable to switches otherwise operated, such for example as limit switches and relays.

In the description, reference is made to the accompanying drawings, forming a part hereof, in which there is shown by way of illustration and not of limitation one certain specific form in which the article of manufacture of the present invention may be embodied.

In the drawings:

Fig. 4 is a front elevation of the base and the mechanism carried thereby.

Fig. 5 is a rear elevation of the cover and the mechanism carried thereby.

Fig. 6 is a front elevation of the switch-mounting block and associated mechanism, removed from the cover and with the buttons and upper springs taken off.

Fig. 7 is a rear elevation of the stop button.

Fig. 8 is a horizontal section, at the start button, of cover and base assembled, as seen from above as though cut along the line 8—8 of Fig. 5. Figs. 8 to 13 are to double the scale of Figs. 4 to 7.

Fig. 9 is a horizontal section, at the stop button, of cover and base assembled, as seen from above, as though cut along the line 9—9 of Fig. 5.

Fig. 10 is an end view, as seen from above in Fig. 6, showing the start mechanism with the upper spring and button replaced.

Fig. 11 is the same as Fig. 10, but with the button pushed in as far as permitted.

Fig. 12 is the same as Fig. 11, but with the push-bar pulled away from the button to clear the head of the push-bar from the confining slots of the switch-mounting block.

Fig. 13 is the same as Fig. 12, but with the push-bar and button reoriented ninety degrees.

Fig. 14 is an end view, as seen from below in Fig. 6, showing the stop mechanism with the upper spring and button replaced.

Fig. 15 is the same as Fig. 14, but with the button pushed in as far as permitted.

Fig. 16 is the same as Fig. 15, but with the push-bar pulled away from the button to clear the head of the push-bar from the confining slots of the switch-mounting block.

Fig. 17 is the same as Fig. 16, but with the push-bar and button reoriented ninety degrees.

Throughout the description, the same reference numeral is applied to the same member or similar members.

Figure 1:
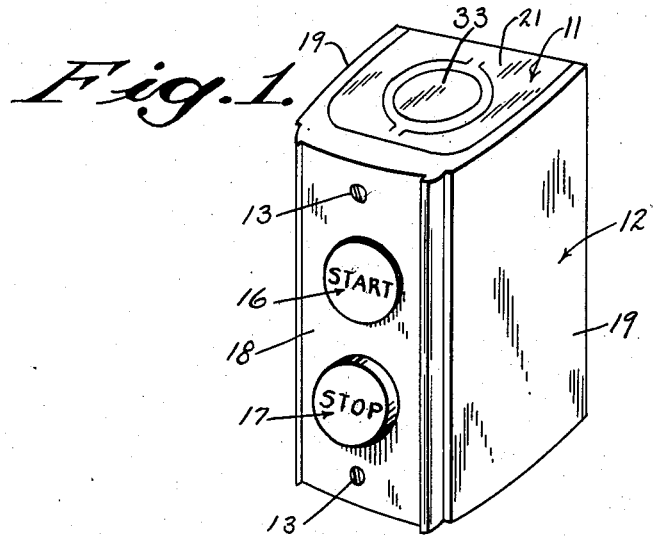
Fig. 1 is a slightly reduced isometric perspective view of the switch of the present invention.
Figure 2:
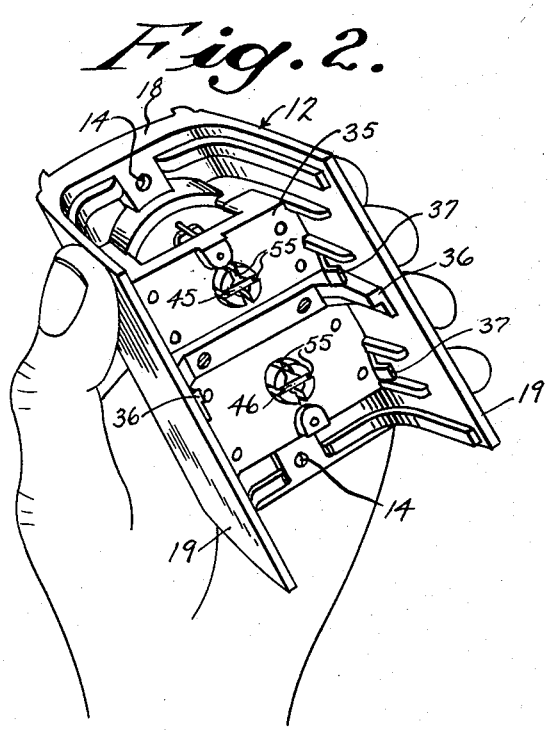
Fig. 2 is a slightly reduced isometric perspective view of the cover of said switch, removed and held in the hand, showing the mechanism carried by and inside said cover.
Figure 3:
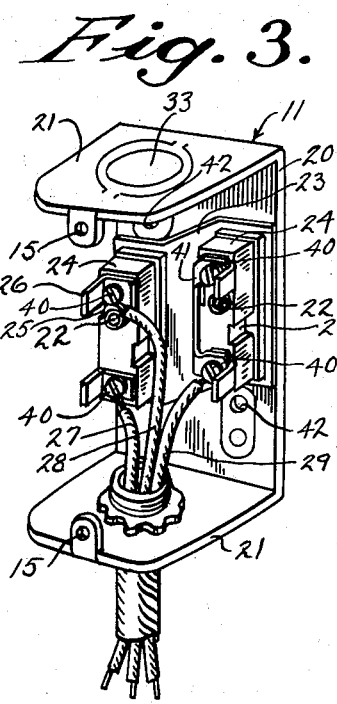
Fig. 3 is a slightly reduced isometric perspective view of the base of said switch, with the cover removed, showing the mechanism carried by and inside said base.

Turning to Figs. 1, 2, and 3, it will be seen that Fig. 1 shows, in closed condition, the box-like enclosure of the present invention, consisting of base 11 and cover 12. The base may conveniently be of bent sheet-metal, whereas the cover is preferably of molded dielectric material. The means to secure the cover to the base consist of screws 13, which pass through holes 14 in the cover, and screw into threaded holes 15 in the base.

Push-buttons 16 and 17 serve to actuate the switching mechanism from outside the enclosure. Inasmuch as push-button 16 serves to close a normally open switch, it lies substantially flush with the cover, so as to prevent accidental closing.

The cover and the mechanism carried thereby is shown in Fig. 2. The cover constitutes the front 18 and sides 19 of the enclosure. It should be made of dielectric material.

The base and the mechanism carried thereby is shown in Fig. 3. The base constitutes the back 20 and the ends 21 of the enclosure.

Secured in the base in any convenient manner, as by rivets 22 and keying (not shown), is a terminal-mounting plate 23 and two terminal blocks 24, at least the latter being made of dielectric material. Each block has a keyway 25, and carries two first assembly contacts 26. Other mechanism carried thereby will be referred to hereinafter. As shown in Fig. 3, there are three wires 27, 28 and 29, which enter through a hole in the bottom end 21. These wires, or any of them, could be extended through the top end 21, by removing knockout plug 33.

Secured in the cover in any convenient manner, as by screws 34, is switch-mounting block 35, which in turn carries the switching mechanism which will be described in more detail later herein. This switch-mounting block includes two keys 36, and carries four cooperative assembly contacts 37.

Keys 36 cannot engage keyways 25 unless the cover is properly oriented with respect to the base. This is an important feature which insures proper assembly.

When properly assembled, each of one of the first assembly contacts 26 (which are relatively more rigid) conductively engages one of the cooperative assembly contacts 37 (which are relatively more resilient), thus wedging the latter against the wall of the cover (see Figs. 8 and 9). This is an important feature, as it prevents distortion of the contacts and insures conductive engagement. These contacts, as well as all other contacts, movable and stationary, are preferably of silver composition or silver plated.

Turning to Fig. 4 and the lower portions of Figs. 8 and 9, it will be more readily seen that each first assembly contact 26 is secured to one of the terminal blocks 24 by means of internally-threaded tubular rivet 38. This end of assembly contact 26 plus screw 40 (whose threads engage the threads of rivet 38) thus constitutes a terminal.

41 is a connector, to conductively connect two of the terminals. The control-station may be mounted by screws driven through holes 42 in back 20.

Turning now to Fig. 6 and the upper portion of each of Figs. 8 and 9, it will be seen that each cooperative assembly contact 37 is secured to switch-mounting block 35 by rivet 43, and extends beyond that rivet to constitute fixed switch-contact 44.

In discussing the switching mechanisms, it will be convenient to use the terms "upper," "lower," "up," "down," and the like, with relation to the relative position of the elements in Figs. 8 to 12. Also to refer to the mechanism of Fig. 8 alternatively as "start" and "normally open," and the mechanism of Fig. 9 alternatively as "stop" and "normally closed." But it is to be understood that these mechanisms can be respectively used for other purposes than starting and stopping, and that two start mechanisms, or two stop mechanisms be employed.

Both mechanisms will now be described with relation to push-bars 45 and 46 respectively. These push-bars are flat thin T-shaped pieces, and may conveniently be of metal. The upper end of each push-bar fits into a slot 47 in the button. See Fig. 7. To guard against putting the wrong button on either switch-mechanism the upper ends of the two push-bars may be of different widths, as shown, with slot 47 correspondingly different.

Part-way down the stem of each push-bar there are two nicks to engage a circular split-washer 48.

Each push-bar carries a movable switch-contact 49, for conductively connecting two adjacent stationary contacts 44. See Fig. 6. Each such movable contact has a marginal slot, which engages a guide 50, so that the movable contact will maintain a given orientation, regardless of any change of orientation of the button and push-bar. There are, with respect to each switch mechanism, two cylindrical stops 51, integral with switch-mounting block 35. The engagement of each of these stops with the rim 52 of the button, and the simultaneous engagement of the end of guide 50 with the groove 53 of the button, serves as stop means to limit the inward movement of the button, and thus limit the inward movement of the push-bar under the influence of the button, while leaving the push-bar free to move further inwardly by sliding partly out of slot 47. However, slot 47 maintains the push-bar and the button irrotational with respect to each other throughout all operations of the invention. But each push-bar and its button would be free to rotate together, were it not that each push-bar has a broadened portion 54 confined selectively to slide longitudinally, but not rotate, in one of a pair of confining slots 55 in switch-mounting block 35. More than a pair of such slots might well be employed.

Referring now to Fig. 8, let us consider the normally-open switch mechanism. Spring 56 bears against button 16 and against movable contact 49. Second spring 57 bears against split-washer 48 and against switch-mounting block 35. Both springs are slightly compressed in the normally-open rest position of the switch mechanism, as shown. Spring 56 is slightly weaker than spring 57. The opposition of the two springs serves to maintain movable contact 49 firmly seated against split-washer 48 always, except when the former is resting on fixed contacts 44; hence the former is always kept from tilting and jamming or becoming disengaged from guide 50. In the rest position, spring 57 alone serves to seat push-bar 45 as far into slot 47 of the button as the depth of slots 55 will permit; and the two springs cooperate to hold the flange of the button against the edge of button-opening in the cover, thus sealing the button-opening to prevent admission of dust. Throughout the entire cycle, hereinafter described, spring 57 constitutes means constantly opposing inward movement of the push-bar and urging it outwardly.

Figure 10:
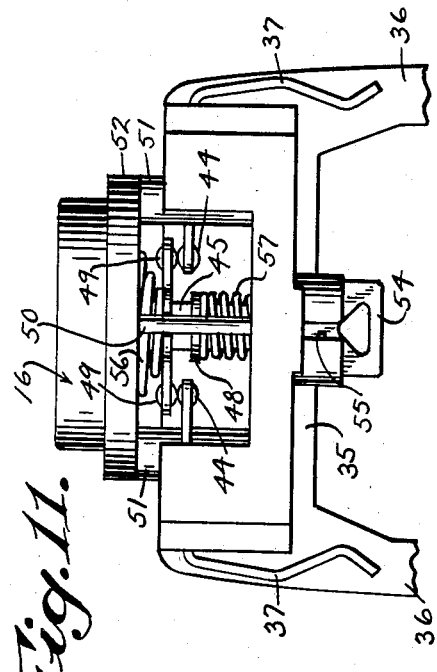

The normal position of rest of the normally-open switch mechanism is shown in Fig. 10 also. When button 16 is pushed, the gap in slot 47 closes. Then the button pushes on push-bar 45, split-washer 48 moves with the push-bar and spring 56 coerces movable contact 49 to follow the split-washer, until the movable contact closes the circuit between fixed contacts 44.

Figure 11:
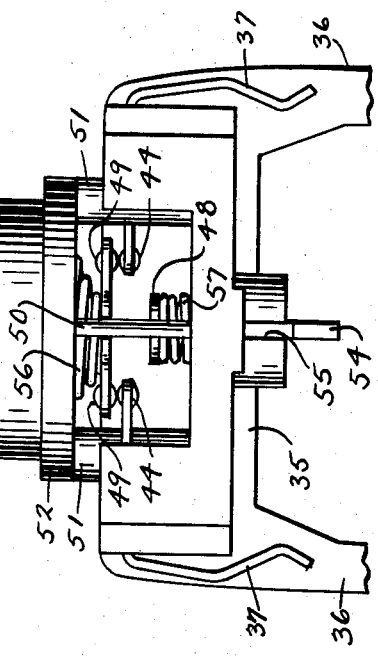

With further inward motion of button and push-bar, the split-washer leaves the movable contact behind and spring 56 maintains the movable contact firmly seated in closed-circuit position. The parts are now as shown in Fig. 11, with broadened portion 54 of push-bar 45 exposed so that it may be grasped. Further pushing of button 16 is prevented by stops 51 and guide 50. The broadened portion 54 of push-bar 45 is still confined against rotation within one of slots 55. This is the extreme inward position, in use.

Figure 12:
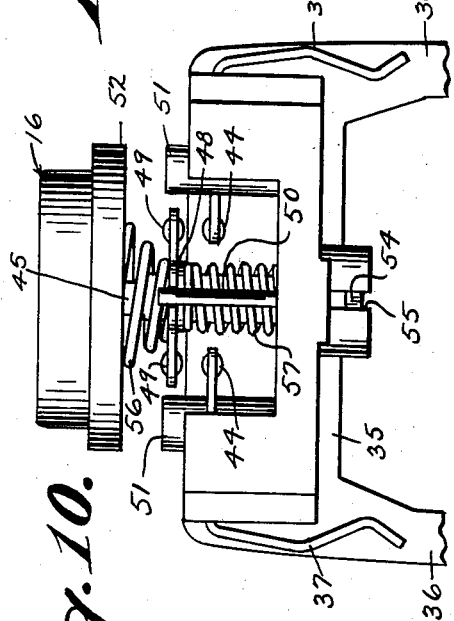
Figure 13:
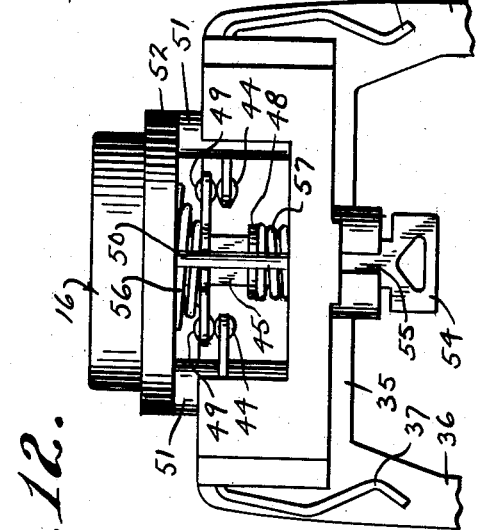

If, however, it be desired to orient button 16, so that the legend which it bears may be readily readable, cover 12 with its contained mechanism is unscrewed and removed from base 11, and held in the left hand, with button 16 pushed-in, so that the mechanism is as shown in Fig. 11. Portion 54 of push-bar 45 is then grasped, preferably by a pair of pliers, and is pulled out, as shown in Fig. 12, thereby freeing it from confinement by slot 55; whereupon the push-bar can be rotated as shown in Fig. 13, and then allowed to slide back into a different slot 55.

Referring now to Fig. 9 let us consider the normally-closed switch mechanism. Spring 56 bears against button 17 and against split-washer 48. Second spring 58 bears against split-washer 48 and against movable contact 49. Spring 59 bears against movable contact 49 and against switch-mounting block 35. All three springs are slightly compressed in the normally-closed rest position of the switch mechanism, as shown. Spring 56 is slightly weaker than spring 58, which, in turn, is slightly weaker than spring 59. Spring 59 serves normally to hold movable contact 49 firmly seated against fixed contacts 44. In the rest position, springs 59 and 58 combine to seat push-bar 46 as far into slot 47 of the button as the depth of slots 55 will permit and the three springs cooperate to hold the flange of the button against the edge of the button-opening in the cover, thus sealing the button-opening to prevent the admission of dust. Throughout the entire cycle, springs 59 and 58 together constitute means constantly opposing inward movement of the push-bar and urging it outwardly.

The position of rest of the normally-closed switch mechanism is shown in Fig. 14 also. When the button 17 is pushed, the gap in slot 47 closes. Thereupon the button pushes on push-bar 46, and split-washer 48 moves with the push-bar, compressing spring 58, until the split-washer contacts a hollow cylindrical collar 60, called the spacer, which surround the push-bar. Then further motion of the push-button, push-bar and split-washer pushes the spacer against movable contact 49 and forces the latter away from fixed contacts 44, until the parts are as shown in Fig. 15, with broadened portion of push-bar 46 exposed so that it may be grasped.

Further pushing of button 17 is prevented by stops 51 and guide 50. The broadened portion 54 of push-bar 46 is still confined against rotation within one of slots 55. This is the extreme inward position, in use.

If, however, it be desired to orient button 17, so that the legend which it bears may be readily readable, one may proceed in the same manner as already described with respect to the normally-open switch mechanism but now illustrated by Figs. 16 and 17.

There has just been described the mechanisms whereby the legend-bearing push-buttons of the control station of the present invention can be conveniently oriented to conform to the orientation of the control station, without removing the buttons from the cover or otherwise disassembling the switch mechanism.

These orientation mechanisms differ slightly as between the form shown in Figs. 8, 10, 11, 12 and 13 and the form shown in Figs. 9, 14, 15, 16 and 17 but the basic principle is the same. This principle may be readily adapted to other switch mechanisms, within the scope of the claims.

Figure 18:
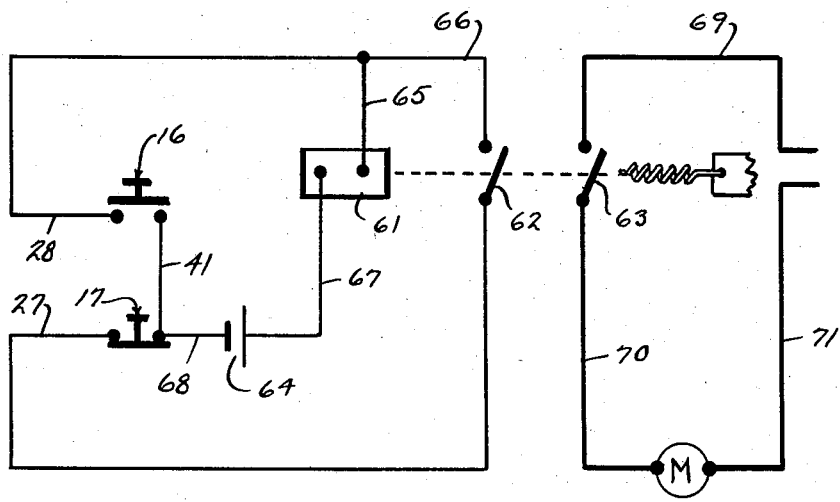
Fig. 18 is a purely illustrative wiring diagram of one use of the switch of the present invention.

Finally, as to Fig. 18, which shows a purely illustrative wiring diagram, for one use of the control station of the present invention, 61 is a solenoid, the energizing of which will close switches 62 and 63. 64 is a source of low-potential current. M is a motor or other electrically-operated instrumentality.

65 to 71 are electric circuits to be, hereinafter, referred to. Light lines represent low-potential conduits. Heavy lines represent high-potential conduits. Conduits 69 and 71 lead to a source of high-potential current, not shown.

When normally-open start switch 16 is closed momentarily, an electric circuit from source 64 is closed through conduit 67, solenoid 61, conduits 65 and 28, switch 16 and conduit 68, thus energizing the solenoid and thereby closing switches 62 and 63. This closing of switch 63 closes an electric circuit from the source, not shown, through conduit 69, switch 63, conduit 70, instrumentality M and conduit 71, thus actuating instrumentality M.

With switch 62 closed, there is now closed thereby the following by-pass circuit from source 64 by-passing switch 16: conduit 68, normally-closed switch 17, conduit 27, switch 62 and conduits 66 and 65. Thus, when switch 16 is released, this by-pass circuit continues to energize solenoid 61, thus continuing to hold switches 62 and 63 closed; and, thus, continuing to energize solenoid 61 and instrumentality M.

But when normally-closed stop switch 17 is momentarily opened, this breaks the last mentioned circuit. The resulting deenergizing of solenoid 61 permits switches 62 and 63 to open and everything reverts to status quo.

It will be readily evident from the foregoing description that the present invention affords a novel and useful control station, which combines the various advantages and accomplishes the various objectives listed earlier herein.

Now that one embodiment of the invention, including two embodiments of the button-orienting feature thereof, has been shown and described, and several departures therefrom have been suggested, it is to be understood that the invention is not to be limited to the specific forms or arrangement of parts herein shown and described.

What is claimed is:

1. In an electrical switch, the combination comprising: a boxlike enclosure, comprising a base adapted to be secured to a support, and a cover; a plurality of first assembly contacts; a plurality of terminals; means conductively connecting each terminal to certain of the first assembly contacts; means mounting the terminals, the first assembly contacts, and the connecting means, within the enclosure on the base; a plurality of cooperating assembly contacts, to conductively engage respectively the first assembly contacts, when the cover is in place on the base; switching mechanism, for conductively connecting together certain of the cooperating assembly contacts; means mounting the cooperating assembly contacts and the switching mechanism within the enclosure on the cover; means for actuating the switching mechanism from outside the enclosure; and means to secure the cover in place on the base; characterized by the fact that there are an interengaging keyway and key, one carried by the base and the other carried by the cover; the key and the keyway being so relatively disposed that, when the cover is in place on the base, the cover will be so oriented with respect to the base as to ensure proper relationship between the switch elements carried by the base and those carried by the cover.

2. In an electrical switch, the combination comprising: a boxlike enclosure, comprising a base adapted to be secured to a support, and a cover; a plurality of first assembly contacts; a plurality of terminals; means conductively connecting each terminal to certain of the first assembly contacts; means mounting the terminals, the first assembly contacts, and the connecting means, within the enclosure on the base; a plurality of cooperating assembly contacts, to conductively engage respectively the first assembly contacts, when the cover is in place on the base; switching mechanism, for conductively connecting together certain of the cooperating assembly contacts; means mounting the cooperating assembly contacts and the switching mechanism within the enclosure on the cover; means for actuating the switching mechanism from outside the enclosure; and means to secure the cover in place on the base; characterized by the cooperating assembly contacts being resilient; each first assembly contact being more rigid than its cooperating contact, and each pair of assembly contacts being so constructed and disposed that, when the cover is in place on the base, each cooperating assembly contact is wedged between its first assembly contact and the wall of the cover.

3. In an electrical switch, the combination comprising: a boxlike enclosure, comprising a base adapted to be secured to a support, and a cover; a plurality of first assembly contacts; a plurality of terminals; means conductively connecting each terminal to certain of the first assembly contacts; means mounting the terminals, the first assembly contacts, and the connecting means, within the enclosure on the base; a plurality of cooperating assembly contacts, to conductively engage respectively the first assembly contacts, when the cover is in place on the base; switching mechanism, for conductively connecting together certain of the cooperating assembly contacts; means mounting the cooperating assembly contacts and the switching mechanism within the enclosure on the cover; means for actuating the switching mechanism from outside the enclosure; and means to secure the cover in place on the base; characterized by the means for actuating the switching mechanism including: a push-button, bearing a legend, and reciprocable inwardly and outwardly with respect to the cover; stop means, carried by the cover, and limiting the outward and inward movement of the button; a push-bar, irrotational with respect to the button, constrained to move inwardly with the button, but free to move further inwardly than constrained by the button, and having a portion confinable against rotation with respect to the cover, the opposite end of the push-bar from the button being graspably exposed when the button has been pushed to its extreme inward position; confining means carried by the cover, and engaging the confinable portion of the push-bar, in a series of selectable positions of rotation of the push-bar, throughout the extent of motion of the push-bar with the button, but free of such engagement, when the push-bar has been grasped and pulled further inward; and spring means opposing the inward movement of the push-bar; whereby the button may be properly oriented for reading the legend thereon, regardless of the orientation of the switch.

References Cited in the file of this patent

UNITED STATES PATENTS

| | | |
|---|---|---|
| 1,938,309 | Williams | Dec. 5, 1933 |
| 2,307,258 | De Smidt et al. | Jan. 5, 1943 |
| 2,828,394 | Mayzik | Mar. 25, 1958 |